Figure 1:
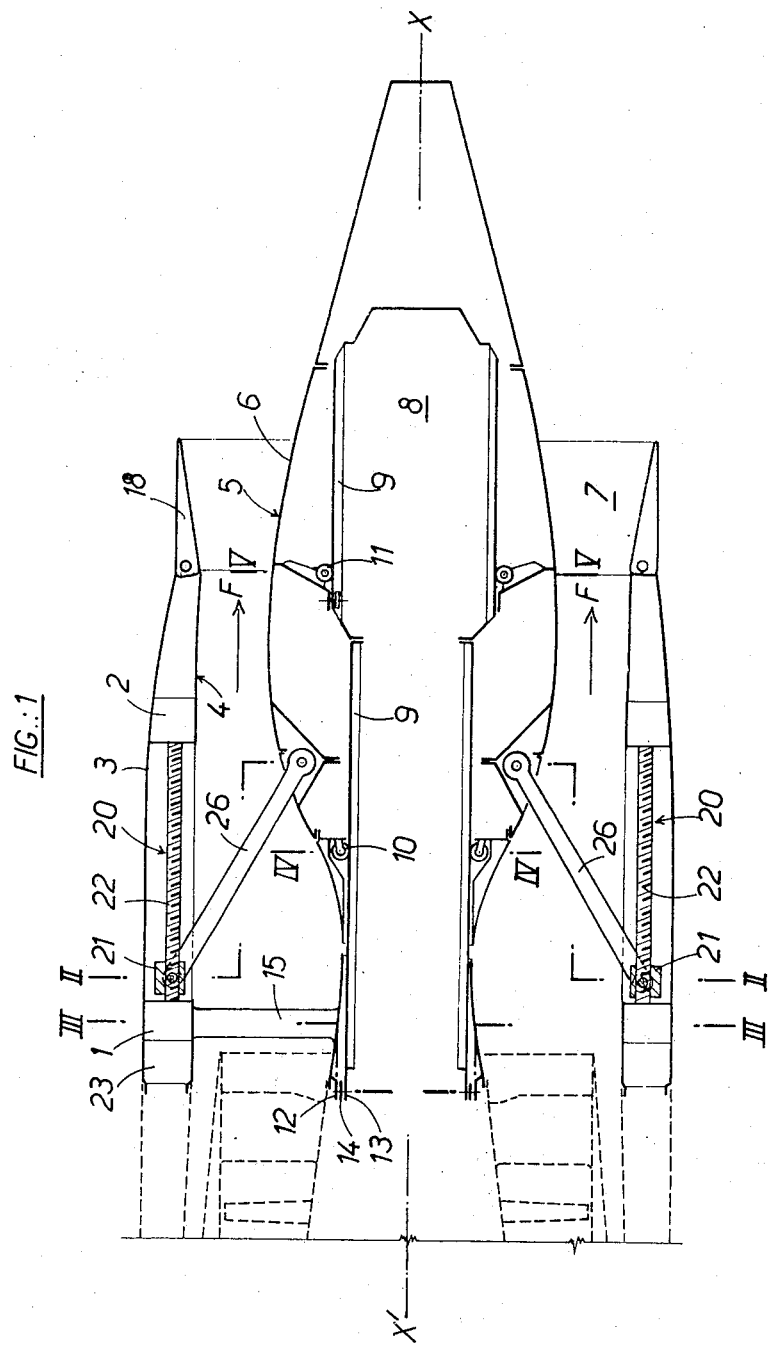

United States Patent [19]

Soligny et al.

[11] 3,807,639
[45] Apr. 30, 1974

[54] VARIABLE-GEOMETRY NOZZLES FOR JET PROPULSION ENGINES

[75] Inventors: Marcel Robert Soligny, Chevilly-Larue; Jean Georges Bouiller, Brunoy; Claude Charles Felix Menoiux, Boulogne-Sur-Seine, all of France

[73] Assignee: Societe Nationale d'Etude et de Construction de Moteurs d'Aviation, Paris, France

[22] Filed: May 2, 1973

[21] Appl. No.: 356,369

[52] U.S. Cl. .................. 239/265.19, 239/265.37
[51] Int. Cl. ..................... B63h 11/10, B64c 9/38
[58] Field of Search..... 239/265.13, 265.19, 265.33, 239/265.37, 265.39, 265.41, 265.43; 181/33 HD

[56] References Cited
UNITED STATES PATENTS
| | | | |
|---|---|---|---|
| 2,700,515 | 1/1955 | Reder ............................ | 239/265.37 |
| 3,352,494 | 11/1967 | Colville et al .............. | 239/265.33 X |
| 3,536,262 | 10/1970 | Hachard ....................... | 239/265.19 |

Primary Examiner—Robert S. Ward, Jr.

[57] ABSTRACT

A variable-geometry nozzle for a jet propulsion engine, designed for installation in an aircraft, comprises a fixed structure, a peripheral envelope carried by the fixed structure and a central body disposed coaxially with the envelope. The central body comprises a supporting structure, supported by the fixed structure, and a streamlined plug or bulb slidable with respect to the supporting structure in the direction of the nozzle axis. The plug and the envelope between them define an annular duct, and control means for the axial displacement of the plug comprise drive means located at the periphery of the nozzle within the thickness of the envelope and comprising screw jacks, either the screws or nuts of which have a component of motion parallel to the nozzle axis. Transmission means which pass through the annular duct comprise links translatable in the direction of said axis and interconnecting the screw jacks and the plug.

6 Claims, 6 Drawing Figures

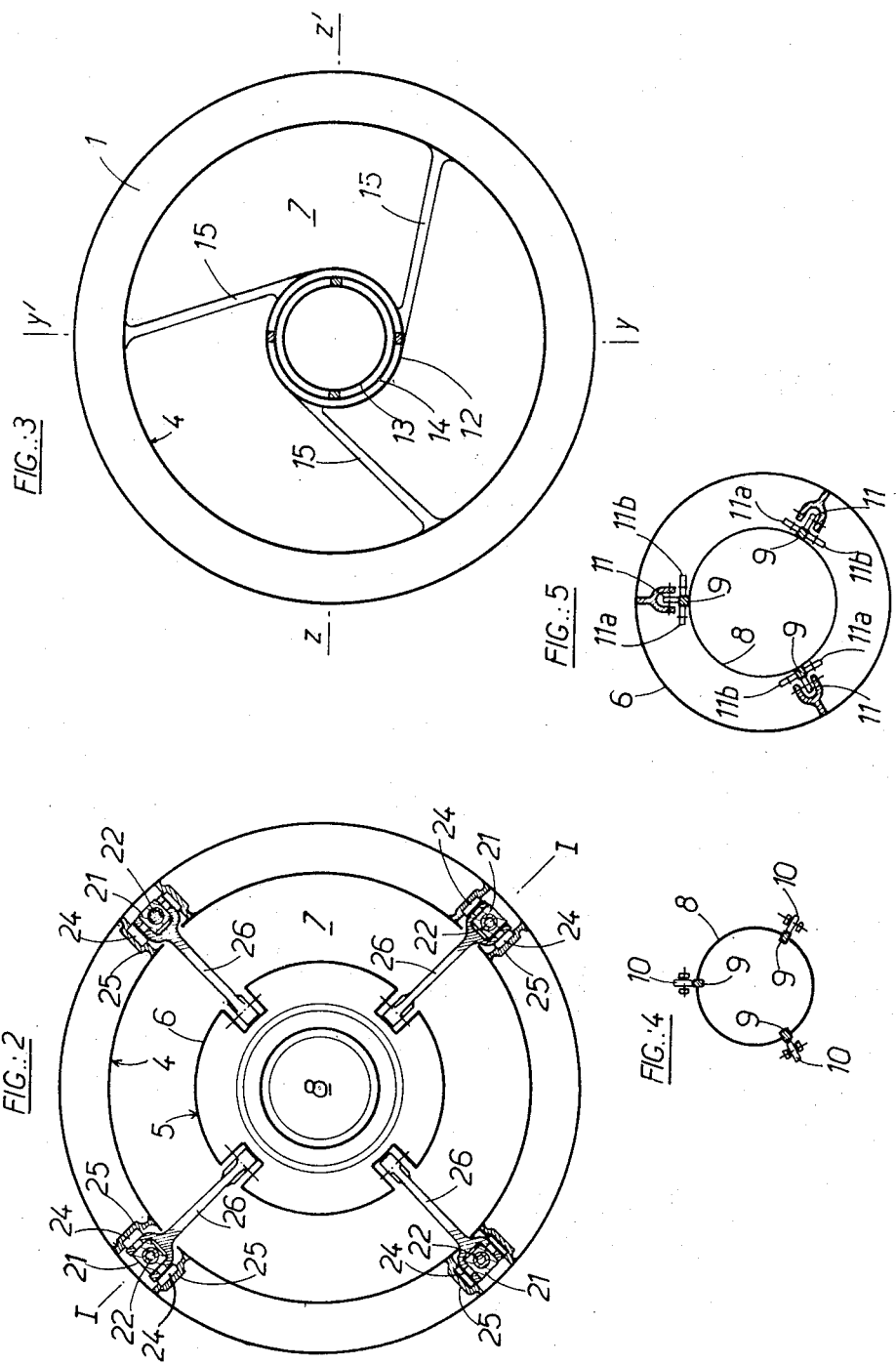

VARIABLE-GEOMETRY NOZZLES FOR JET PROPULSION ENGINES

The present invention relates to a variable-geometry nozzle for a jet propulsion engine of the kind comprising a fixed structure, a peripheral envelope carried by said fixed structure, a central body disposed coaxially with respect to said envelope and coming, on the one hand, a supporting structure itself supported by said fixed structure and, on the other hand, a streamlined body assembled in relation to said supporting structure so as to be slidable in the direction of the nozzle axis. The plug and the envelope define between them an annular duct, and the engine comprises control means for displacing said plug in said direction, which control means comprise drive means located at the periphery of the nozzle and transmission means which pass through said annular duct and connect said drive means to the plug.

Within the context of the present invention, the expression "nozzle" should be construed in the widest possible sense and it is intended to cover both an exhaust assembly (expansion nozzle) and an intake assembly (air intake), forming part of a jet propulsion engine designed for installation in a flying machine such as an aircraft. By way of example, however, in the following text the case of an expansion nozzle is more particularly considered.

Before going any further, it should also be pointed out that there are two categories of nozzles: nozzles with a central body (also known as plug nozzles), which delimit a flow duct having an annular-cross-sectional area, and nozzles without such a central body, which delimit a "full" flow area.

To enable an engine to maintain high performance through a wide range of operating conditions on the part of the aircraft—take off, subsonic flight, transsonic flight, and supersonic flight—it is generally equipped with a variable-geometry nozzle, which is convergent in subsonic flight and convergent-divergent in supersonic flight.

In a nozzle without a central body, the changes in nozzle geometry are produced by means of a system of convergent-divergent peripheral flaps comprising, for example, an upstream set of convergent flaps and a downstream set of divergent flaps. This kind of flap system is relatively complex and it has, furthermore, the drawback of increasing the aerodynamic drag of the engine, at any rate in certain operating conditions.

In a nozzle with a central body, the changes in the nozzle geometry can be produced by axial displacement, in relation to the periphery or envelope of the nozzle, of a streamlined plug (or bulb, or spear) forming part of the central body. In known nozzles of this design, the central body to this end comprises a supporting structure upon which the plug is slidably assembled and inside which drive means are arranged, such as a jack, which make it possible to control the axial displacements of said plug.

A nozzle designed in this fashion is slightly simpler than a nozzle which employs convergent-divergent peripheral flaps for its control, and it moreover presents the advantage that, other things being equal, the aerodynamic drag can be kept smaller than that of an equivalent nozzle in which control is effected by convergent-divergent peripheral flaps.

It would seem, therefore, that for reasons of efficiency nozzles controlled by a sliding plug should always be given preference over nozzles in which control is achieved by convergent-divergent peripheral flaps. In practice, however, this is not the case and the utilisation of nozzles of this kind has hitherto been reserved most of the time for engines of low or medium power, high power engines generally being controlled by convergent-divergent peripheral flaps.

The reason is that, as soon as the dimensions of the nozzle and the engine power increase beyond a certain limit, the suspension required to center a sliding plug which becomes progressively heavier and more bulky, and to control the axial displacements thereof, experiences stresses (mechanical, aerodynamic and thermal) which become progressively higher and make the suspension arrangement extremely difficult to design under satisfactory economic conditions.

The object of the present invention, generally speaking, is to make it possible to extend to large nozzles, designed for incorporation into high power engines, the advantages of the efficiency of sliding plug nozzles.

To this end, in a nozzle of the kind described and equipped with drive means located at the nozzle periphery and transmission means traversing the annular passage and linking said drive means to the plug, the invention provides that said drive means comprise at least one element capable of translational movement in a direction which has a component parallel to the axis of the nozzle, and that said transmission means comprise at least one link one end of which is fixed to said moving element whilst its other end is fixed to said plug, said link being translatable in said direction.

In accordance with one preferred embodiment, the translatable element forms part of a jack. The jack can advantageously be a screw jack in which case the translatable element is constituted by the screw or nut of the jack.

In accordance with another preferred feature of the invention, the supporting structure for the central body is suspended from the fixed nozzle structure through the medium of a deformable joint, for example a universal joint.

The assembly of features provided in accordance with the invention makes it possible, in a simple and economical fashion, to achieve correct guidance and centring of the plug within the nozzle, preventing any jamming during translational movement of the plug.

Figure 1A:
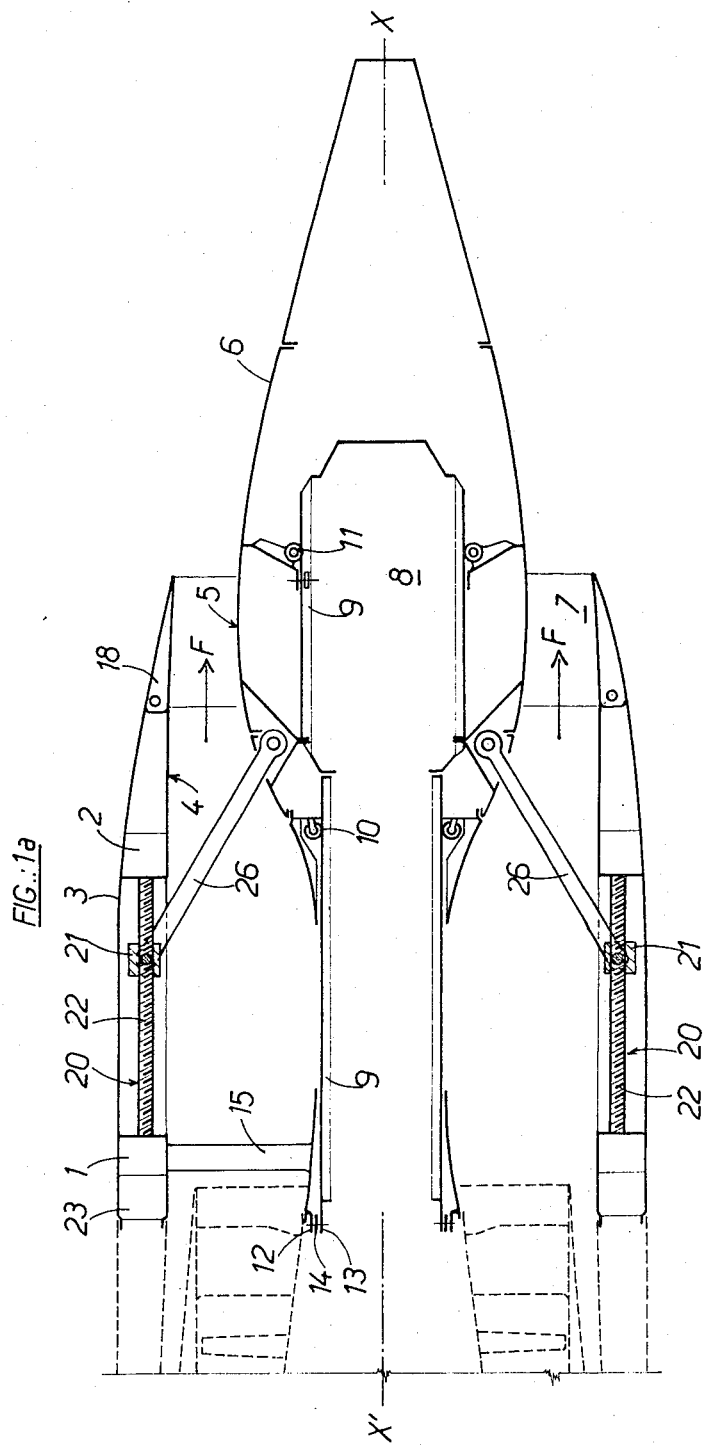

The following description with reference to the accompanying drawings of one embodiment of the invention, shown by way of non-limitative example, indicates how the invention may be put into effect. In the drawings:

FIG. 1 is a longitudinal sectional view on the line I—I of FIG. 2, of a nozzle with a controllable plug in accordance with the invention, the plug being in the retracted position, FIG. 1a is a view similar to that of FIG. 1, but with the plug in the extended position, and FIGS 2, 3, 4 and 5 are transverse sectional views, taken respectively on the lines II—II, III—III, IV—IV and V—V of FIG. 1.

In the drawings a variable-geometry jet pipe, with an axis X'—X, is illustrated which forms part of a jet engine such as a turbo-jet engine designed to propel a flying machine such as an aircraft.

In this nozzle, an upstream frame 1 and a downstream frame 2 interconnected by spars 3 together define a fixed reference structure designed to carry a peripheral envelope or fairing 4, with an axis X'-X, and a central body 5 disposed coaxially with said envelope. The fairing 4 terminates at its downstream end in controllable flaps 18.

The central body 5 comprises in particular a streamlined plug (bulb, spear etc.) 6 which can be moved axially in relation to the fairing 4 and delimits, with the latter, an annular duct 7 through which a gas flow F passes.

The central body 5 also comprises a supporting structure 8 upon which the plug 6 is slidably mounted. As FIGS. 1, 4 and 5 show, the supporting structure 8 is equipped with rails 9 upon which run an upstream group and a downstream group of rollers fixed to the plug 6. Each of these two groups of rollers comprises, for example, three rollers 10 or 11 bearing radially upon the rails 9; the downstream group, furthermore, comprises three rollers 11a, and three rollers 11b which bear laterally on said rails. Although they are not located in the plane of FIG. 1, the rollers 10 and 11 (the true arrangement of which is visible in FIGS. 4 and 5) have for the purposes of illustration been assumed to have been shifted into this plane.

The supporting structure 8 is attached to the fixed structure 1, 2, 3 aforementioned, through the medium of a universal joint. To this end, a universal suspension system (see FIGS. 1 and 3) is provided comprising three coaxial rings; namely an external ring 12, an internal ring 13 and an intermediate ring 14. The external ring 12 is secured to the structure 1, 2, 3, by means of tangential arms 15 which are streamlined. The internal ring 13 is secured to the supporting structure 8. As far as the intermediate ring 14 is concerned, this is articulated, in the manner shown by FIG. 3, on the one hand to the external ring 12 about an axis y'-y and, on the other hand, to the internal ring 13 about an axis z'-z perpendicular to y'-y. The supporting structure 8 is thus suspended from the fixed structure 1, 2, 3 through the medium of a deformable attachment.

The axial translational movement of the plug or bulb 6 is produced by control means comprising drive means located at the periphery of the nozzle.

The drive means comprise, in the example illustrated, four jacks 20 located, at least in part, within the thickness of the peripheral envelope 4 and each incorporating an element 21 translatable in a direction which has a component parallel to the axis X'-X of the nozzle. Each of these jacks is, for example, of screw-type with a screw 23 rotated through the medium of a control box 23, the moving element 21 being a nut. Each moving element or nut 21 is provided laterally with two rollers 24 (see FIG. 2) rolling upon rails 25 carried by the fixed structure 1, 2, 3. The movements of four jacks 20 are synchronised with each other, for example by means of a system (not shown) of flexible shafts which interconnect the control boxes 23.

Transmission means passing through the annular duct 7 connect the aforesaid drive means to the plug or bulb 6. In the example illustrated, these transmission means comprise streamlined links 26 equal in number to the number of moving elements or nuts 21, each link having one end articulated to one of the moving elements 21 and the other to the plug 6.

In operation, the moving elements or nuts 21 translate along the rails 25 and, because of the presence of the links 26, take the plug 6 with them, with the latter sliding on the supporting structure 8 through the medium of the rollers 10, 11, 11a, 11b. FIGS. 1 and 1a respectively illustrate the plug in the "retracted" position (supersonic flight) and in the "extended" position (subsonic flight). The flaps 18 are then, respectively, in open and closed positions.

The control of the plug 6 by means of drive means located at the nozzle periphery makes it possible to ensure in all positions of the plug that the latter is correctly centered in relation to the fixed reference structure 1, 2, 3 and to the peripheral envelope 4. This centring is particularly difficult to achieve, in a large-sized nozzle, with a central body comprising a sliding plug controlled by drive means located inside said body.

The universally deformable suspension arrangement 12, 13, 14 makes it possible to ensure that, whatever the position of the plug 6, the plug and the supporting structure 8 are maintained coaxial with one another, thus preventing any jamming during the translational movement of the plug.

The dispositions provided in accordance with the invention make it possible to extend the advantages of the efficiency of the sliding plug type nozzle to nozzles of any size.

It goes without saying that the embodiment described is purely an example and could be modified, in particular by the substitution of equivalent techniques, without in so doing departing from the scope of the invention.

We claim:

1. A variable-geometry nozzle for a jet engine: comprising a fixed structure; a peripheral envelope carried by the fixed structure; a central body disposed coaxially with said envelope and comprising a supporting structure supported by said fixed structure and a streamlined plug assembled in relation to said supporting structure so as to be slidable in the direction of a longitudinal axis of the nozzle, said plug and envelope between them defining an annular duct; and control means for displacing said plug in said direction comprising drive means located at the periphery of the nozzle and transmission means which pass through said duct and connect the drive means to the plug, said drive means comprising at least one element capable of translational movement in a direction with a component parallel to said longitudinal axis and the transmission means comprising at least one link with one end fixed to said one element and another end fixed to said plug with the link translatable in said direction.

2. A nozzle as claimed in claim 1, wherein said translatable element forms part of a jack.

3. A nozzle as claimed in claim 2, wherein the jack is a screw jack and the translatable element is constituted by the screw or nut of the jack.

4. A nozzle as claimed in claim 1, wherein said one element is one of a plurality of such elements spaced around the periphery of the nozzle and located, at least in part, within the thickness of said envelope.

5. A nozzle according to claim 1, further comprising deformable attachment means by which said supporting structure is suspended from said fixed structure.

6. A nozzle as claimed in claim 5, wherein the supporting structure is suspended in a universally movable manner from said fixed structure.

* * * * *

UNITED STATES PATENT OFFICE
CERTIFICATE OF CORRECTION

Patent No. 3,807,639          Dated April 30, 1974

Inventor(s) Marcel Robert Soligny, Jean Georges Bouiller and Claude Charles Felix Menioux It is certified that error appears in the above-identified patent and that said Letters Patent are hereby corrected as shown below:

[75] Inventors: Marcel Robert Soligny, Chevilly-Larue;
Jean Georges Bouiller, Brunoy;
Claude Charles Felix Menioux, Boulogne-Sur-Seine, all of France.

[30] Foreign Application Priority Data:

May 2, 1972    France      72 15552

Signed and sealed this 17th day of September 1974.

(SEAL)
Attest:

McCOY M. GIBSON JR.
Attesting Officer

C. MARSHALL DANN
Commissioner of Patents